United States Patent [19]
Doran, Jr. et al.

[11] 3,881,536
[45] May 6, 1975

[54] RUBBER VULCANIZATES

[75] Inventors: Thomas J. Doran, Jr., Norton, Ohio; Roland H. Hess, Au, Switzerland

[73] Assignee: PPG Industries, Inc., Pittsburgh, Pa.

[22] Filed: May 13, 1974

[21] Appl. No.: 469,566

Related U.S. Application Data
[63] Continuation-in-part of Ser. No. 285,297, Aug. 31, 1972, abandoned.

[52] U.S. Cl.......... 152/330; 152/209 R; 106/308 Q; 260/42.32; 260/42.33; 260/42.34; 260/42.37; 260/42.44; 260/42.47; 260/42.49; 260/82.3; 260/83.7; 260/85.3 R; 260/85.3 C; 260/92.3; 260/94.2 R; 260/448.8 R; 260/765; 260/886; 260/887
[51] Int. Cl..... C08c 11/10; B60c 5/00; B60c 11/00
[58] Field of Search....... 260/448.8 R, 42.32, 42.33, 260/42.34, 42.37, 42.44, 42.47, 42.49, 82.3, 83.7, 85.3 R, 85.3 C, 92.3, 94.2 R, 765, 886, 887; 106/308 Q; 152/330

[56] References Cited
UNITED STATES PATENTS

| | | | |
|---|---|---|---|
| 3,075,948 | 1/1963 | Santelli | 260/827 |
| 3,364,059 | 1/1968 | Marzoechi | 260/448.8 R |
| 3,443,620 | 5/1969 | Vanderbilt et al. | 152/330 |

OTHER PUBLICATIONS

Miron et al., Abstracts of Am. Chem. Soc. Natl. Meeting, September 1971, page ORPL35 QD 1A48.

Primary Examiner—Donald E. Czaja
Assistant Examiner—H. H. Fletcher
Attorney, Agent, or Firm—Irwin M. Stein

[57] ABSTRACT

Improved siliceous pigment reinforced rubber vulcanizates are provided by incorporating into the vulcanizable rubber composition a coupling amount of silanated rubber coupling agent that is the catalytic reaction product of an organohydrosilane, such as triethoxysilane, and unsaturated synthetic rubber polymer having pendant vinyl groups, such as polybutadiene rubber and styrene-butadiene rubber.

20 Claims, No Drawings

RUBBER VULCANIZATES

CROSS-REFERENCE TO RELATED APPLICATIONS

This application is a continuation-in-part application of our co-pending application, Ser. No. 285,297, filed Aug. 31, 1972, for SILANATED RUBBER COUPLING AGENTS, and now abandoned.

DESCRIPTION OF THE INVENTION

In the rubber industry, it is conventional to incorporate reinforcing pigments into natural and synthetic rubbers to increase the hardness, stiffness, strength, and resistance to tear and abrasion of the rubber vulcanizate. Principal among the reinforcing pigments used today are the various carbon blacks. One of the principal non-black fillers used in the rubber industry is siliceous pigment, e.g., the finely-divided hydrated silicas and silicates. These siliceous pigments are used to impart improved tensile strength, tear resistance and abrasion resistance to the rubber vulcanizate. Thus, rubber shoe soles typically contain siliceous pigment. Further, hydrated silica pigments are used in combination with carbon black to obtain maximum mileage in off-the-road tires, e.g., tires for mining and logging operations and for road-buidling equipment. Such applications have become well established over the past twenty years. However, when used as the sole reinforcing filler, none of the non-black fillers provide the overall improved performance obtained by the use of the carbon blacks. This is observed most readily in rubber vulcanizates used for tires, e.g., tire treads.

It has now been found that the properties of vulcanized rubber compounds containing finely-divided reinforcing siliceous pigment can be improved by including in the vulcanization compounding recipe an effective or coupling amount of a silanated rubber coupling agent that is the catalytic reaction product of an organohydrosilane, such as triethoxysilane, and an unsaturated synthetic rubber polymer having pendant vinyl groups, such as styrene-butadiene rubber. The silanated rubber coupling agent (sometimes referred to alternatively as the silanated rubber) can be added separately to the vulcanization compounding recipe, masterbatched with a portion of the rubber or adsorbed on the surface of all or a portion of the siliceous pigment and thereby added to the vulcanization compounding recipe. In this latter embodiment, the silanated rubber-siliceous pigment composition (sometimes referred to herein as the rubber additive) comprises a major amount of siliceous pigment and a minor amount of the silanated rubber. The amount of silanated rubber used is, of course, an amount sufficient to couple or bond the siliceous pigment to the vulcanizable elastomer, e.g., sulfur-curable rubber, used in the vulcanization recipe. The use of a coupling amount of silanated rubber, results in an improvement of the abrasion resistance, heat build-up or other measures of rubber reinforcement of the rubber vulcanizate.

The vulcanized rubber compounds produced by use of the silanated rubber and siliceous pigment reinforcing filler are abrasion resistant and rigid and thus are suitable for use as tire treads, subtreads, hoses, belts, and other applications where abrasion resistance or rigidity are desired. Although not wishing to be bound by any particular theory, it appears from the evidence at hand that the silanated rubber coupling agent bonds by chemical and/or physical bonding the siliceous pigment to the vulcanizable rubber compound representing the principal rubber(s) used to prepare the vulcanized rubber particle, i.e., the silanated rubber acts as a bridge to physically connect the siliceous pigment to the vulcanizable rubber.

DETAILED DESCRIPTION

The organohydrosilane used to prepare the silanated rubber coupling agent is a dual functional compound having the functionalities A and B. In the aforementioned designation of functionality, A represents a functional group that is capable of forming chemically and/or physically a bond with a siliceous pigment particle. Such bond, for example, can be between the silicon atom of the organohydrosilane present in the silanated rubber coupling agent and an oxygen atom of the siliceous pigment particle. In the aforementioned designation of functionality, B represents a hydrosilyl group, ($\equiv$ SiH). The functional group, A, can be directly connected to B or A can reside on a separate silicon atom that is connected to B by a bivalent organic or inorganic compound; or, connected by an element, such as oxygen or nitrogen. The dual functional compound can be further represented by the general formula designation, HSi-A.

The preferred dual functional compound is an organohydrosilane. However, in general, silicon compounds that provide a functional group that is capable of forming a bond with the siliceous pigment particle can be used. Preferred organohydrosilanes include compounds of the general formula:

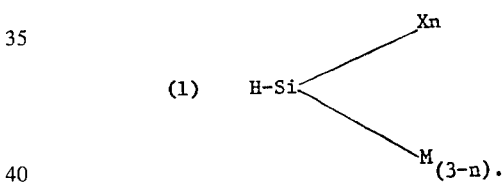

wherein X is any reactive group that will react with silanol ($\equiv$ SiOH) groups that are present on the surface of the siliceous pigment particle, thereby forming a bond between the silicon atom of the organohydrosilane present in the silanated rubber coupling agent and the oxygen atom of the pigment, and $n$ is 1, 2 or 3. X can be, for example, a halogen, e.g., chlorine or bromine. The silicon-halogen bond reacts with the silanol group on the pigment and hydrogen halide is formed. Alternatively, X can be hydrogen or the hydrocarbyloxy group, —OM, wherein M is selected from the group consisting of $C_1$–$C_{10}$, cycloalkyl, aryl, aralkyl, alkaryl, or acyl or a member of such hydrocarbyloxy groups bearing halogen substituents, e.g., chlorine and bromine. The number of carbon atoms in the hydrocarbon radicals represented by M preferably vary between 1 and 10, more preferably between 1 and 5. The preferred organohydrosilanes are 1 to 5 carbon trialkoxy substituted silanes such as trimethoxysilane, H—Si(OCH$_3$)$_3$ or triethoxysilane (H—Si(OCH$_2$CH$_3$)$_3$. As used in the formulae set forth herein, letter designations will have the same meaning whenever used.

Other organohydrosilanes that can be used to prepare the silanated rubber coupling agent can be represented by the formulae:

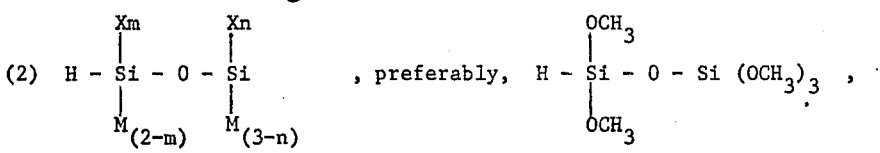

wherein m is 1 or 2;

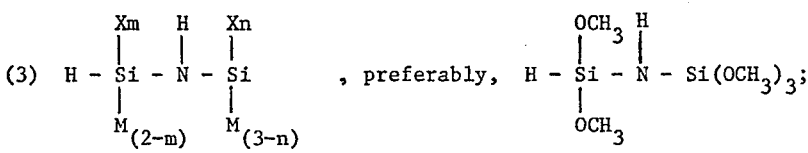

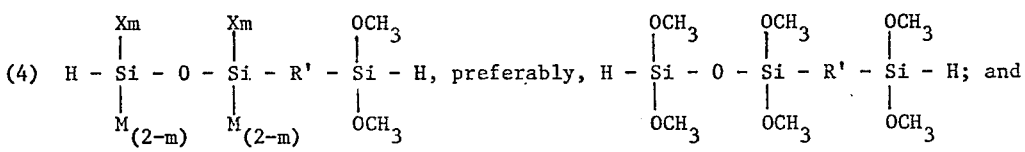

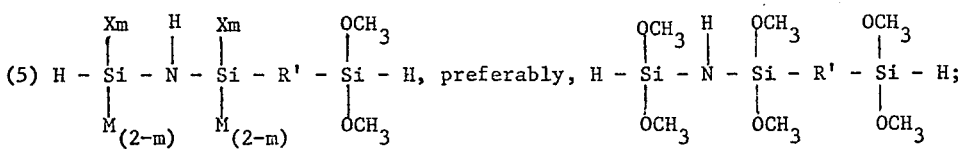

In the preceding formulae (4) and (5), R' joins the organohydrosilyl groups in a stable manner. In some instances, R' may be a chemical bond directly between the silicon atoms; but, generally R' will be a divalent hydrocarbon radical. R' is preferably an alkylene radical, i.e., $+R'+$, having from 1 to 10 carbon atoms and, more preferably, from 1 to 4 carbon atoms. R' can be branched, unsaturated, or a cycloalkylene radical, e.g., 1,4-cyclobutylene or 1,4-cyclohexylene.

Examples of organohydrosilane reactants that can be used to prepare the silanated rubber coupling agent described herein include; dimethyl chlorosilane, methyl dichlorosilane, trichlorosilane, dimethyl ethoxysilane, phenyl diethoxysilane, phenyl dichlorosilane, trimethoxysilane, triisobutoxysilane, triethoxysilane, triisopropoxysilane, bis-2-ethoxymethylsilane, diethoxy-p-chlorophenylsilane, triacetoxysilane, and diacetoxy cyclohexyloxysilane.

Synthetic rubbers that can be employed to prepare the silanated rubber coupling agent are those unsaturated rubbers having pendant vinyl groups. Typically, such rubbers have at least 1 percent, e.g., from about 1 to about 50 percent, of their total olefinic unsaturation present as pendant vinyl groups. Preferably the rubber has at least 5 and more preferably at least 10 percent pendant vinyl groups, e.g., from 5 to 50 percent and from 10 to 50 percent respectively. Rubbers having from 5 to 30 percent pendant vinyl groups are considered very suitable. Such rubbers are known in the art and are commercially available. Examples of suitable rubbers include: styrene-butadiene rubber (e.g., 40–95 percent butadiene and 5–60 percent styrene wherein the rubber has at least about 1 percent and preferably 5–30 percent of the butadiene copolymerized by 1,2-addition); polybutadiene (wherein the rubber has at least about 1 percent and preferably 5–30 percent of the butadiene copolymerized by 1,2-addition); and ethylene-propylene-diene (EPDM) rubbers in which the diene component, e.g., 5-vinyl-2-norbornene, is copolymerized to provide at least 1 percent and preferably 20 to 90 percent of the total olefinic unsaturation as pendant vinyl groups. Other suitable rubbers that can be employed include polyisoprene, butadiene-acrylonitrile copolymers and polychloroprene. The rubber that is used can also be a physical blend of at least about 5–90 percent and preferably 15–75 percent of one of the above synthetic unsaturated rubbers containing pendant vinyl groups with 5–95 percent preferably 25–85 percent of rubbers, such as natural rubber, synthetic 1,4-polybutadiene, synthetic 1,4-polyisoprene, and EPDM rubbers, which rubbers lack significant amounts of pendant vinyl groups. While a number of rubbers have been disclosed, the above list is not intended to be all inclusive as any rubber or rubber blend that has at least 1 percent of its total olefinic unsaturation as pendant vinyl groups can be employed. For use in tire treads, the rubber is preferably of the conventional type used in that application, such as styrenebutadiene rubber, butadiene rubber and EPDM rubber. Such rubbers can be used blended with or without natural rubber.

The amount of organohydrosilane used will vary with the amount of silane desired in the silanated rubber. Broadly, the silanated rubber can be prepared by reacting from about 0.2 to about 50 parts, preferably from about 5 to about 50 parts by weight of organohydrosilane per 100 parts of synthetic rubber polymer having pendant vinyl groups.

The silanated rubber can be prepared by reacting the organohydrosilane with the synthetic rubber polymer containing pendant vinyl groups inn the presence of a catalyst. Preferably, the reaction is conducted in a liquid reaction medium. This catalyzed addition reaction is well known in the art. See, for example, the article "Silane-Modified Polybutadienes" by J. Miron et al., which was presented at the American Chemical Society National Meeting held on Sept. 12–17, 1971. See also British Patent Specification No. 1,090,328 which describes the preparation of organosilicon-modified polymers as an intermediate product for the preparation of polyoxyalkylene substituted organosilicon polymers useful as surfactants in the manufacture of polyurethane foams.

The temperature at which the catalytic addition reaction is conducted can vary widely; but, generally will vary between about 20° and about 200°C. The temperature for any particular reaction will be governed largely by the volatility of the reactants used, the catalyst and the boiling point of the solvent, if any, used. In many cases, it is convenient and preferred to carry out the reaction at the reflux temperature of the reaction mixture. Generally, the reaction is conducted at atmospheric pressure, although, if desired, sub-atmospheric or super-atmospheric pressures can be used. Further, the reaction should be conducted under anhydrous conditions and in the absence of air.

While a variety of catalysts can be used, it is preferred to use a platinum catalyst. This may be in the form of metallic platinum, either as such or on a carrier such as platinized charcoal or platinized asbestos; in the form of chloroplatinic acid; or as a complex of a platinous halide and an olefin, for example of platinous chloride and cyclohexene or decene. Other catalysts that can be employed are disclosed in "Organic Metallic Compounds of the Group IV Elements", Volume I, page 231, et seq. and page 257 et seq., edited by MacDiarmid and published by Marcel Dekker, Inc., New York, 1968.

The amount of catalyst employed will vary widely and will depend on the amount organohydrosilane desired in the silanated rubber reaction product. Generally, the catalyst can be used in an amount of between about $1 \times 10^{-11}$ mole of catalyst/mole hydrosilane and $1 \times 10^{-2}$ mole of catalyst/mole hydrosilane (mole/mole) e.g., between $6 \times 10^{-11}$ and $6 \times 10^{-6}$ mole/mole. Preferably, the catalyst is used in amounts of between $1 \times 10^{-8}$ mole/mole and $1 \times 10^{-4}$ mole/mole, e.g., between $3 \times 10^{-8}$ and $4 \times 10^{-8}$ mole/mole.

Reaction times will vary but generally periods of between about 1 and 72 hours are used for the reaction. Typically, an average reaction period will be about 24 hours. While improved rubber reinforcement can result by using reaction times as long as 72 hours, the incremental additional rubber reinforcement attained by the use of a 72-hour reaction time as contrasted to about a 24-hour reaction time is not generally sufficient to warrant the cost of the longer reaction period.

As described, the reaction is typically conducted in a presence of a solvent that is capable of dissolving the reactants. Typically, solvents that are chemically inert in the reaction, such as the aromatic hydrocarbons, e.g., benzene, toluene, xylene, etc. are used. However, other organic solvents, e.g., hydrocarbon solvents, can also be used. While the solvent has been characterized as inert, it is not meant to exclude solvents that contain as inert, e.g., pyridine, N,N-dimethyl aniline or triethylamine or other liquid amines that can be used to remove the hydrogen halide generated when a halogenated organohydrosilane is used as one of the reactants. Solvents other than the aforementioned aromatic solvents that can be used include hydrocarbons and ethers, such as n-heptane, di-n-butyl ether, and ethylene glycol dimethylether. The amount of solvent used in reaction can vary widely, of course. Generally, between 1 and 50 parts of solvent per part of the reactants can be used.

In a typical reaction, the synthetic rubber polymer containing pendant vinyl groups is dissolved in a solvent, such as benzene. The organohydrosilane, such as triethoxysilane, is added to the rubber solution along with the catalyst. Best results have been found when the entire amount of the catalyst is added at the beginning of the reaction rather than in increments throughout the reaction. The reaction mixture is then heated to reaction temperature, e.g., 80°C. (the boiling point of benzene), and maintained at that temperature for the period of reaction, e.g., 24 hours. Commonly, an inert gas is maintained above the reaction medium to prevent oxidation of the rubber. The reaction product is then recovered from the solvent, e.g., by precipitation with methanol. The precipitated reaction product can be recovered and dried by conventional techniques, e.g., by filtration and drying under vacuum. If the silanated rubber reaction product is not to be used within a few hours, an antioxidant is preferably added to the reaction product to prevent oxidation of the synthetic rubber.

Catalytic addition of the organohydrosilane to the pendant vinyl group results in a silanated rubbery polymer having units in its chain represented by formulae (6) and (7), predominantly (6).

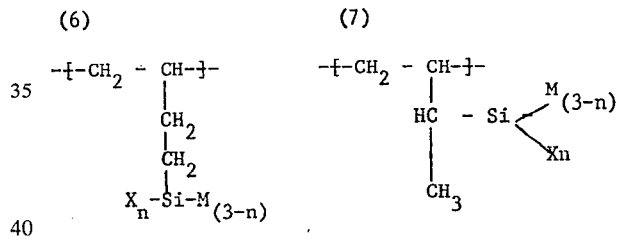

The letter designations in such formulae have been explained with respect to formula (1). As can be seen from such formulae, the silane portion of the silanated rubber is free to react or bond to the siliceous pigment, in the manner described heretofore. The catalytic addition reaction is highly selective with regard to addition of the silane to the pendant vinyl groups. Further, use of a catalyst permits the use of relatively mild reaction conditions and minimizes side reactions that could lead to the ultimate destruction of rubber properties. In contrast, the high temperatures required for thermal addition, e.g., 300°–500°C. would char and cross-link the rubber.

The siliceous pigment (alternatively referred to herein as silica pigment) that can be used includes both pyrogenic and precipitated finely-divided silicas of the type heretofore employed for rubber compounding. The siliceous pigment, however, is preferably of the type obtained by precipitation from a soluble silicate, such as sodium silicate. For example, silica pigment produced according to the method described in U.S. Pat. No. 2,940,830 can be used. These precipitated, hydrated silica pigments have an $SiO_2$ content of at least 50 percent and usually greater than 80 percent by weight on an anhydrous basis. The siliceous pigment have an ultimate particle size in a range of 50 to 1,000 angstroms, preferably between 50 and 400 and, more preferably, between 100 and 300 angstroms. The BET surface area of the pigment as measured using nitrogen gas is preferably in the range of 40 to 600, usually 50 to 300 square meters per gram. The BET method of measuring surface area is described in the *Journal of the American Chemical Society*, Vol. 60, page 304 (1930). A typical commercial form of such reinforcing siliceous pigment is manufactured and sold by PPG Industries, Inc., under the trademark, Hi-Sil 233.

The amount of siliceous pigment used as the reinforcing filler can vary widely, generally between about 10 and about 90 parts of siliceous pigment per 100 parts of total rubber are used. More typically, between about 30 and 75 parts of siliceous pigment per 100 parts of rubber are used. On the average, 50 to 65 parts of siliceous pigment per 100 parts of rubber is found most desirable.

Depending upon its silane content, the silanated rubber can be used as prepared, or, it can be blended with additional vulcanizable rubber polymer to prepare a blend suitable for incorporating into a vulcanizable rubber composition. It is, of course, possible to react all of the synthetic rubber polymer having pendant vinyl groups used in the preparation of the vulcanizable rubber composition with the organohydrosilane. However, such a procedure is not considered economically viable. Thus, in common practice, it is contemplated that the silanated rubber be used as a compounding additive and added to the vulcanizable rubber in the same manner as the metal oxides, accelerators, oils, antioxidants, sulfur, the reinforcing siliceous pigment, or other fillers, if used, and any other rubber compounding ingredient typically added to a vulcanizable rubber to form a vulcanizable rubber composition that can be vulcanized.

Regardless of the manner in which the silanated rubber is added to the vulcanizable rubber composition, sufficient silane to effectively couple the siliceous pigment to the vulcanizable rubber polymer should be incorporated into the vulcanizable rubber composition. Such amount is commonly referred to as a coupling amount. While the amount of organohydrosilane equivalent required to effectively couple the siliceous pigment to the vulcanizable rubber can vary; generally between about 0.2 and about 5, preferably from 0.5 or 1 to 3 parts of the organohydrosilane equivalent per 100 parts of the total amount of rubber in the vulcanizate is used.

In a further embodiment, the silanated rubber can be formulated with the siliceous pigment to prepare a rubber compounding additive by, for example, mixing the silanated rubber with the pigment by conventional means, such as in a Banbury mixer or on a rubber mill. Alternatively, the silanated rubber can be adsorbed or coated onto the surface of the siliceous pigment for example, by direct use of the silanated rubber reaction mixture. Thus, the silanated rubber and siliceous pigment can be mixed, prior to incorporating such ingredients into the rubber batch, in a hydrocarbon solvent such as benzene or other suitable inert solvent at between about 0° and about 80°C. for between about 1 and about 300 minutes and until the silanated rubber is adsorbed on the siliceous pigment. In this manner, the silanated rubber can be more rapidly incorporated into the rubber batch and any tendency of the rubber to become overheated or scorched is thereby obviated or minimized. The rubber additive will typically comprise from 0.5 to 30 parts of silanated rubber per 50 parts of siliceous pigment. Thus, the siliceous pigment will contain from about 1 to about 60 percent by weight of silanated rubber. Such silanated rubber will contain, when used in a vulcanizable rubber composition, from about 0.2 to about 5 parts of organohydrosilane equivalent per 100 parts of total vulcanizable rubber.

The silanated rubber, blend of silanated rubber with other vulcanizable rubber or the rubber compounding additive (siliceous pigment mixed with the silanated rubber) can be blended with the uncured rubber used to prepare the rubber vulcanizate by conventional means such as in a Banbury mixer or on a rubber mill at temperatures between about 100° and 300°F. A typical vulcanizable rubber composition will contain, based on 100 parts of total vulcanizable rubber polymer, from 30 to 75 parts of siliceous pigment and from 0.2 to about 30 parts of the silanated rubber (the rubber portion of which contributes to making up the said 100 parts of total vulcanizable rubber), the silanated rubber providing from about 0.2 to 5 preferably from about 0.5 to 3 parts of organohydrosilane equivalent per 100 parts of total vulcanizable rubber. Other conventional rubber additives can be employed such as the conventional sulfur or peroxide cure systems. The sulfur cure system can include 0.5 to 3 parts sulfur, 2 to 5 parts zinc oxide, and 0.5 to 2 parts accelerator. The peroxide cure system can include 1 to 4 parts of a peroxide such as dicumyl peroxide (Dicup 40C-Trademark of Hercules Powder Co., Inc.). Although not essential, other conventional rubber additives can also be used. Such additives include other fillers such as carbon black, oils, plasticizers, anti-oxidants, and colors. The particular compounding recipe will vary with the particular vulcanizate prepared; but, such recipes are well-known to those skilled in the art.

The following Examples will serve to illustrate the invention and its preferred embodiments. In such Examples, as well as the specification and claims, parts and percentages are given by weight unless otherwise indicated.

EXAMPLE 1

A cold non-pigmented styrene-butadiene rubber comprising 25 percent styrene and 75 percent butadiene having the ASTM designation SBR-1502 (400 grams) was extracted with acetone for 72 hours in a Soxhlet extractor to remove the additives. The additives were removed to place the experimental results obtained on the same basis as other experimental results since rubbers purchased from different suppliers can contain different additives. The rubber was then dried in a vacuum oven to remove the acetone and wrapped in aluminum foil and stored in a desiccator until used for rubber compounding. A 5 liter round-bottomed 3-necked flask was then equipped with a water condenser, stirring paddle, and nitrogen inlet connector, and 3 liters of reagent grade benzene was added. The benzene was stirred under a blanket of nitrogen for about 30 minutes and 100 grams of the aforesaid rubber which had been cut into thin slivers to facilitate dissolution was added. The rubber was allowed to dissolve and 5 grams of triethoxysilane added. After a minute of mixing, 0.8 milliliters of 0.1 molar hexachloro-platinic acid was added. Heat was applied by means of a heating jacket and the solution was refluxed gently for 24 hours while maintaining a slight positive nitrogen pressure. The solution was then allowed to cool to room temperature while maintaining the positive nitrogen pressure. The resultant silanated styrene-butadiene rubber was then precipitated by pouring the 3 liters of solution into 2 gallons of rigorously stirred methanol. The curable polymer was hand squeezed free of excess methanol, dried in a vacuum oven at 55°C. and the dried polymer was stored in nitrogen filled jars.

EXAMPLE 2

The procedure of Example 1 was repeated but for the exception that 1.2 milliliters of catalyst was employed.

EXAMPLE 3

The procedure of Example 1 was repeated but for the exception that 25.2 parts of the resultant product was blended at room temperature with 76 parts of natural rubber in a Brabender to provide 1.2 parts of triethoxysilane equivalent for 100 parts of total rubber.

EXAMPLE 4

The procedure of Example 1 was repeated but for the exception that the silanated rubber was not precipitated from the benzene but rather the benzene mixture was used to coat the siliceous pigment. Three hundred seventy-five milliliters of the 5 parts triethoxysilane per 100 parts of styrene-butadiene rubber benzene solution was used to coat 30 grams of Hi-Sil 233 siliceous pigment, dried in a forced draft oven for 24 hours at 110°C. to remove absorbed moisture, by the following procedure:

To a 3-necked 1 liter round-bottomed flask fitted with a thermometer, stirrer, and distillation column were added 400 milliliters of toluene and 30 grams of the dried siliceous pigment and the pigment slurried. A slight positive pressure of nitrogen was introduced and the last traces of water were removed by distilling off 200 milliliters of toluene-water distillate. After distilling the slurry free of water, it was allowed to cool to about 80°C. and 75 milligrams of triethylenediamine was introduced to the slurry and mixed for 15 minutes. A 5 parts silanated styrene-butadiene rubber solution previously prepared (375 milliliters) was slowly added to the stirred slurry and the slurry refluxed for 3 to 4 hours under a nitrogen atmosphere, allowed to cool to room temperature, poured into 1 pint of rigorously stirred methanol to insure precipitation of the polymer, filtered on a Buchner funnel, washed with 500 milliliters of toluene and washed with a final 200 milliliters of ether. The coated pigment was then dried under reduced pressure of about 1 millimeter at room temperature for 48 hours.

EXAMPLE 5

In accordance with the general procedure of Example 4, 50 parts of the silanated SBR rubber solution was used to coat 60 grams of dried siliceous pigment to provide a concentration of 2 percent triethoxysilane equivalent by weight of the siliceous pigment.

A quantity of pigment (63 grams) sold by PPG Industries, Inc. under the trademark "Hi-Sil 233" was dried in a forced draft oven for 24 hours at 110°C. to remove absorbed moisture in the pigment. To a 3-necked 1 liter round-bottomed flask fitted with a thermometer, stirrer, and distillation column were added 800 milliliters of toluene and 60 grams of the dried siliceous pigment and the pigment slurried. A slight positive pressure of nitrogen was introduced and the last traces of water were removed by distilling off 400 milliliters of toluene-water distillate. After distilling the slurry free of water, it was allowed to cool to about 80°C. and 150 milligrams of triethylenediamine was introduced to the slurry and mixed for 15 minutes. A 50 parts silanated styrene-butadiene rubber solution previously prepared (72 milliliters) was slowly added to the stirred slurry and the slurry refluxed for 3 to 4 hours under a nitrogen atmosphere, allowed to cool to room temperature, poured into one pint of rigorously stirred methanol to insure precipitation of the polymer, filtered on a Buchner funnel, washed with 500 milliliters of toluene and washed with a final 200 milliliters of ether. The coated pigment was then dried under reduced pressure of about 1 millimeter at room temperature for 48 hours. The coated pigment was mixed on a Brabender with 97.5 grams of styrene-butadiene rubber.

Rubber compounds were prepared by mixing the ingredients shown in Table I (other than the ingredients marked by an asterisk which were added to the rubber mix on an open rubber mill) in a Banbury for about 5 minutes at a temperature between 300° and 320°F.

TABLE I
Rubber Compounds

| Ingredients (Parts by Weight) | 1 | 2 | 3 | 4 | 5 | 6 | 7 | 8 | 9 | 10 | 11 | 12 | 13 |
|---|---|---|---|---|---|---|---|---|---|---|---|---|---|
| Natural rubber | - | - | - | - | - | - | - | - | 100 | 76 | 75 | - | - |
| SBR 1502 (cold polymerized butadiene-styrene rubber containing 25% styrene) | 100 | 87.5 | 75 | 100 | 87.5 | 75 | 76 | 63 | - | - | - | 100 | 97.5 |
| Coupling Agent of Example 1 | - | 13.13(6) | 26.3(7) | - | - | - | - | - | - | - | - | - | - |
| Coupling Agent of Example 2 | - | - | - | - | 13.13(6) | 26.5(7) | - | - | - | - | - | - | - |
| Coupling Agent of Example 3 | - | - | - | - | - | - | - | - | - | 25 | - | - | - |
| Coupling Agent of Example 4 | - | - | - | - | - | - | 85.2(2) | 101(3) | - | 86.3(4) | 86.3(4) | - | - |
| Coupling Agent of Example 5 | - | - | - | - | - | - | - | - | - | - | - | - | 63.8(5) |
| Hi-Sil 233(1) | 60 | 60 | 60 | 60 | 60 | 60 | - | - | - | 60 | - | 60 | - |
| Phenyl-beta-naphthylamine | 1 | 1 | 1 | 1 | 1 | 1 | 1 | 1 | 1 | 1 | 1 | 1 | 1 |

TABLE I—Continued

|  | 1 | 2 | 3 | 4 | 5 | 6 | 7 | 8 | 9 | 10 | 11 | 12 | 13 |
|---|---|---|---|---|---|---|---|---|---|---|---|---|---|
| *Zinc Oxide | 4 | 4 | 4 | 4 | 4 | 4 | 4 | 4 | 4 | 4 | 4 | 4 | 4 |
| *2,2'-Benzothiazyl disulfide | 1.5 | 1.5 | 1.5 | 1.5 | 1.5 | 1.5 | 1.5 | 1.5 | - | - | - | 1.5 | 1.5 |
| *Di-ortho-tolylguanidine | 1.5 | 1.5 | 1.5 | 1.5 | 1.5 | 1.5 | 1.5 | 1.5 | - | - | - | 1.5 | 1.3 |
| *Sulfur | 2.5 | 2.5 | 2.5 | 2.5 | 2.5 | 2.5 | 2.5 | 2.5 | 2.5 | 2.5 | 2.5 | 2.5 | 2.5 |
| *N-tert-butyl-2-benzothiazole sulfonamide | - | - | - | - | - | - | - | - | 1.5 | 1.5 | 1.5 | - | - |
| *Tetramethylthiuram disulfide | - | - | - | - | - | - | - | - | .25 | .25 | 2.5 | - | - |

Footnotes for Table I:

* Added on open mill and mixed for about 10 minutes at 180°F.

(1) Trademark, PPG Industries, Inc. A precipitated, hydrated silica having an ultimate particle size of 200 angstrom, a BET surface area of approximately 150 square meters per gram, and containing $SiO_2$ — 87.5%, CaO — 0.75%, $R_2O_3$ — 0.95%, NaCl — 1.6%, a weight loss at 105°C. of 6.3% and the balance is bound water.

(2) This value represents 25.2 parts of silanated rubber (24.0 parts of SBR-1502 + 1.2 parts of triethoxysilane) on 60 parts of Hi-Sil 233 to provide 1.2 parts of triethoxysilane equivalent per 100 parts of total rubber.

(3) This value represents 40.95 parts of silanated rubber (39 parts of SBR-1502 + 1.95 parts of triethoxysilane) on 60 parts of Hi-Sil 233 to provide about 1.95 parts of triethoxysilane equivalent per 100 parts of total rubber.

(4) This value represents 26.25 parts of silanated rubber (25 parts of SBR-1502 + 1.25 parts of triethoxysilane) on 60 parts of Hi-Sil 233 to provide 1.25 parts of triethoxysilane equivalent per 100 parts of total rubber.

(5) This value represents 3.75 parts of silanated rubber (2.5 parts of SBR-1502 + 1.25 parts of triethoxysilane) on 60 parts of Hi-Sil 233 to provide 1.25 parts of triethoxysilane equivalent per 100 parts of total rubber.

(6) This value represents 13.13 parts of silanated rubber (12.5 parts of SBR-1502 + 0.63 parts of triethoxysilane) to provide about 0.7 parts of triethoxysilane equivalent per 100 parts of total rubber.

(7) This value (Z) represents 26.3 (compound 3) or 26.5 (compound 6) parts of silanated rubber (25 parts of SBR-1502 + (Z-25) parts of triethoxysilane) to provide about 1.4 parts of triethoxysilane equivalent per 100 parts of total rubber.

The rubber compounds in Table I were than subjected to various physical tests and the results are reported in the following Table II.

TABLE II

|  | Rubber Compound | 95% Cure (Min.) | Modulus 100% Elongation[1] (p.s.i.) | Tensile Strength[1] (p.s.i.) | Percent Elongation[1] | Hardness (Shore A)[2] | Pico Abrasion Index[3] |
|---|---|---|---|---|---|---|---|
| 1 | Control | 37 | 380 | 2520 | 480 | 85 | 64 |
| 2 | Example 1 (.7%) | 44 | 530 | 2890 | 320 | 84 | 112 |
| 3 | Example 1 (1.4%) | 53 | 820 | 2360 | 220 | 85 | 176 |
| 4 | Control | 37 | 335 | 2980 | 540 | 84 | 64 |
| 5 | Example 2 (.7%) | 45 | 510 | 3770 | 390 | 84 | 114 |
| 6 | Example 2 (1.4%) | 73 | 920 | 2870 | 220 | 86 | 193 |
| 7 | Example 2 (1.2%) | 55 | 720 | 2560 | 250 | 83 | 197 |

TABLE II—Continued

| | Rubber Compound | 95% Cure (Min.) | Modulus 100% Elongation[1] (p.s.i.) | Tensile Strength[1] (p.s.i.) | Percent Elongation[1] | Hardness (Shore A)[2] | Pico Abrasion Index[3] |
|---|---|---|---|---|---|---|---|
| 8 | Example 2 (1.95%) | 71 | 1100 | 1910 | 150 | 85 | 273 |
| 9 | Control | 26 | 380 | 3520 | 570 | 81 | 63 |
| 10 | Example 2 (1.2%) | 30 | 660 | 2820 | 330 | 78 | 102 |
| 11 | Example 4 (1.3%) | 27 | 590 | 1720 | 230 | 79 | 88 |
| 12 | Control | 14 | 330 | 2690 | 540 | 80 | 68 |
| 13 | Example 5 (1.3%) | 43 | 500 | 3180 | 420 | 78 | 120 |

[1] Tested according to ASTM D-412.
[2] Tested according to ASTM D-314.
[3] Tested according to ASTM D-2228-63 T.

The data reported in Table II demonstrate that the compounds are both abrasion-resistant and resistant to deformation and thus useful for belting, hose, tires, and other applications where abrasion resistance and rigidity are desired.

EXAMPLE 6

In accordance with the general procedure of Example 5, 10 pounds of siliceous pigment were coated with a 50 parts of silanated styrene-butadiene rubber (SBR-1502) to 2 percent concentration of triethoxysilane equivalent, based on the siliceous pigment, for a tire test. SBR-1502 (95.6 parts) was blended with 63.6 parts of the silanated SBR coated siliceous pigment, 1 part Flexamine G (Uniroyal TM for antioxidant), 1 part phenyl-beta-naphthylamine and 1 part stearic acid in a Banbury. To this mixture was then added on the mill 1.2 parts 2,2'-benzothiazyl disulfide, 1.2 parts diortho-tolylguanidine, 1.85 parts sulfur and 6 parts zinc oxide master batch comprising one-third styrene-butadiene rubber and two-thirds zinc oxide and the mixing continued for about 10 minutes at 180°F. Tires were prepared by Three-T-Fleet, Inc., substantially as described in U.S. Pat. No. 3,397,583. The tires were found to have a Road Wear Index of 85 at 2200 miles and 89 at 4400 miles of use.

In determining the Road Wear Index, a tread band or portion was prepared of the compound of Example 6. The tread band was applied to a new tire carcass. The tire cure included pre-heating the rubber compound for 35 minutes at 210°F., then placing same in the mold for 17 minutes at 331°F. The tire was mounted on an automobile which was driven at 70 moles per hour on a hard-surfaced road for 4,400 miles. The road traveled was flat and included a combination of curved portions and straight portions. This test is designated as being a combination of slow and fast wear. The amount of tread lost during the test is determined and the Road Wear Index shows a comparison of the wear of each of the thread bands with an arbitrary standard of reference of 100 for a N-285 (ASTM designation) carbon blackfilled composition. The tire size was 7.35 by 14 inches. The load was 1160 pounds on the tire and the tire was inflated to 32 pounds per square inch gauge.

While there are above described a number of specific embodiments of the present invention, it is obviously possible to produce other embodiments and various equivalent modifications thereof without departing from the spirit of the invention.

Having set forth the general nature and specific embodiments of the present invention, it is not intended that such details be regarded as limitations upon the scope of the invention except as and to the extent that they are included in the accompanying claims.

We claim:

1. In the process of compounding a siliceous pigment reinforced sulfur curable rubber to provide a vulcanizable composition suitable for use in the manufacture of tires, the improvement which comprises including in the composition a silanated rubber coupling agent consisting essentially of the catalytic reaction addition product of (1) organohydrosilane having the dual functionality, A and B, wherein A is a functional group capable of forming a bond with a siliceous pigment particle and B is a hydrosilyl group and (2) synthetic unsaturated rubber polymer having at least 1 percent by weight of its olefinic unsaturation present, as pendant vinyl groups, said coupling agent furnishing from about 0.1 to about 3 parts of organohydrosilane equivalent per 100 parts of total rubber in the vulcanizable composition.

2. The process of claim 1 wherein the synthetic unsaturated rubber polymer having pendant vinyl groups is styrene-butadiene rubber, butadiene rubber, ethylene-propylene-diene rubber or mixtures of such rubber.

3. The process of claim 1 wherein the sulfur curable rubber is styrene-butadiene rubber, natural rubber, butadiene rubber, ethylene-propylene-diene rubber, synthetic 1,4-polyisoprene rubber, butadiene-acrylonitrile rubber or polychloroprene rubber.

4. The process of claim 1 wherein the organohydrosilane is represented by the general formula:

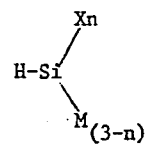

wherein X is halogen, hydrogen, or the hydrocarbyloxy group —OM; M is an alkyl, cycloalkyl, aryl, aralkyl, alkaryl or acyl group containing from 1 to 10 carbon atoms or one of said group having halogen substituents; and $n$ is 1, 2 or 3.

5. The process of claim 1 wherein the organohydrosilane is trimethoxysilane or triethoxysilane.

6. The process of claim 1 wherein the synthetic unsaturated rubber polymer has from 1 to 50 percent of its olefinic unsaturation as pendant vinyl groups.

7. The process of claim 5 wherein the synthetic unsaturated rubber polymer has from 5 to 30 percent of its olefinic unsaturation as pendant vinyl groups.

8. A vulcanizate of a vulcanizable rubber composition comprising (a) sulfur curable rubber, (b) from 10 to 90 parts of siliceous pigment per 100 parts of sulfur curable rubber, and (c) silanated rubber coupling agent consisting essentially of the catalytic reaction addition product of (1) organohydrosilane having the dual functionality, A and B, wherein A is a functional group capable of forming a bond with a siliceous pigment particle and B is a hydrosilyl group and (2) synthetic unsaturated rubber polymer having from 5 to 50 percent by weight of its olefinic unsaturation present as pendant vinyl groups, said coupling agent furnishing from about 0.1 to about 3 parts of organohydrosilane equivalent per 100 parts of total rubber in the vulcanizable composition.

9. The vulcanizate of claim 8 wherein the synthetic unsaturated rubber polymer having pendant vinyl groups is styrene-butadiene rubber, butadiene rubber, ethylene-propylene-diene rubber or mixtures of such rubber.

10. The vulcanizate of claim 8 wherein the sulfur curable rubber is styrene-butadiene rubber, natural rubber, butadiene rubber, an ethylene-propylene-diene rubber, synthetic 1,4-polyisoprene rubber, butadiene-acrylonitrile rubber or polychloroprene rubber.

11. The vulcanizate of claim 8 wherein the organohydrosilane is represented by the general formula:

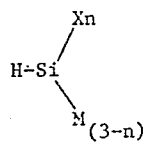

wherein X is halogen, hydrogen, or the hydrocarbyloxy group —OM; M is an alkyl, cycloalkyl, aryl, aralkyl, alkaryl or acyl group containing from 1 to 10 carbon atoms or one of said group having halogen substituents; and $n$ is 1, 2 or 3.

12. The vulcanizate of claim 11 wherein $n$ is 3 and X is an alkoxy group containing from 1 to 5 carbon atoms inclusive.

13. The vulcanizate of claim 12 wherein the synthetic unsaturated rubber polymer is styrene-butadiene rubber and the sulfur curable rubber is natural rubber.

14. The vulcanizate of claim 11 wherein the synthetic unsaturated rubber polymer has from 5 to 30 percent of its olefinic unsaturation present as pendant vinyl groups.

15. A rubber tire having as a tread component thereof a vulcanizate of a vulcanizable rubber composition comprising (a) sulfur curable rubber, (b) from 30 to 75 parts of siliceous pigment, and (c) silanated rubber coupling agent consisting essentially of the catalytic reaction addition product of (1) organohydrosilane represented by the general formula:

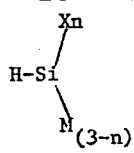

wherein $n$ is 3 and X is an alkoxy group containing from 1 to 5 carbon atoms inclusive and (2) synthetic unsaturated rubber polymer having from 5 to 30 percent of its olefinic unsaturation present as pendant vinyl groups, said coupling agent furnishing from about 0.1 to 3 parts of organohydrosilane equivalent per 100 parts of total rubber in the vulcanizable composition.

16. The tire of claim 15 wherein the synthetic unsaturated rubber polymer having pendant vinyl groups is styrene-butadiene rubber, butadiene rubber, ethylene-propylene-diene rubber or mixtures of such rubbers.

17. The tire of claim 16 wherein the sulfur curable rubber is styrene-butadiene rubber, natural rubber, butadiene rubber, ethylene-propylene-diene rubber, synthetic 1,4-polyisoprene rubber, butadiene-acrylonitrile rubber or polychloroprene rubber.

18. A rubber additive comprising siliceous pigment and from 1 to 50 percent by weight of silanated rubber consisting essentially of the catalytic reaction addition product of (1) 0.2 to 50 parts of organohydrosilane having the dual functionality, A and B, wherein A is a functional group capable of forming a bond with a siliceous pigment particle and B is a hydrosilyl group and (2) 100 parts of synthetic unsaturated rubber polymer having from 1 to 60 percent by weight of its total olefinic unsaturation present as pendant vinyl groups.

19. The rubber additive of claim 18 wherein the organohydrosilane is represented by the general formula:

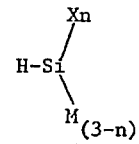

wherein X is halogen, hydrogen, or the hydrocarbyloxy group —OM; M is an alkyl, cycloalkyl, aryl, aralkyl, alkaryl or acyl group containing from 1 to 10 carbon atoms or one of said group having halogen substituents; and $n$ is 1, 2 or 3.

20. The rubber additive of claim 18 wherein the synthetic unsaturated rubber polymer pendant vinyl groups is styrene-butadiene rubber, butadiene rubber, ethylene-propylene-diene rubber or mixtures of such rubber and said polymer has from 5 to 30 weight percent of its olefinic unsaturation present as pendant vinyl groups.

* * * * *